US 6,714,245 B1

United States Patent
Ono (10) Patent No.: US 6,714,245 B1
(45) Date of Patent: Mar. 30, 2004

(54) VIDEO CAMERA HAVING A LIQUID-CRYSTAL MONITOR WITH CONTROLLABLE BACKLIGHT

(75) Inventor: Yasumasa Ono, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/270,686

(22) Filed: Mar. 16, 1999

(30) Foreign Application Priority Data

Mar. 23, 1998 (JP) .............................. 10-074011
Jan. 29, 1999 (JP) .............................. 11-021806

(51) Int. Cl.⁷ .............................................. H04N 5/222
(52) U.S. Cl. ........................................ 348/333.13; 345/63
(58) Field of Search ..................... 348/333.01, 333.02, 348/333.03, 333.04, 333.05, 333.06, 333.07, 333.08, 333.09, 333.1, 333.11, 333.12, 333.13, 790, 791; 345/63, 102

(56) References Cited

U.S. PATENT DOCUMENTS

| | | | | |
|---|---|---|---|---|
| 5,086,513 A | * | 2/1992 | Lawrence et al. | 455/186.1 |
| 5,315,695 A | * | 5/1994 | Saito et al. | 345/102 |
| 5,511,201 A | * | 4/1996 | Kamimaki et al. | 713/310 |
| 6,111,559 A | * | 8/2000 | Motomura et al. | 345/102 |
| 6,400,360 B1 | * | 6/2002 | Yamazaki | 345/211 |
| 6,411,306 B1 | * | 6/2002 | Miller et al. | 345/102 |
| 2001/0043166 A1 | * | 11/2001 | Jacobsen et al. | 345/27 |

FOREIGN PATENT DOCUMENTS

JP       06315127    * 11/1994     ............ H04N/5/66

* cited by examiner

Primary Examiner—Wendy R. Garber
Assistant Examiner—Jason Whipkey
(74) Attorney, Agent, or Firm—Fitzpatrick, Cella, Harper & Scinto (57) ABSTRACT

A video camera includes a liquid-crystal monitor for displaying an image picked up by the camera, a backlight provided behind the liquid-crystal monitor, a switch for turning on/off a power supply of the camera, and a controller for reducing luminance of the backlight when the power supply has been turned on.

8 Claims, 12 Drawing Sheets

STANDBY MODE SWITCH

VIDEO CAMERA HAVING A LIQUID-CRYSTAL MONITOR WITH CONTROLLABLE BACKLIGHT

BACKGROUND OF THE INVENTION

1. Field of the Invention

The present invention relates to a liquid-crystal monitor whose luminance can be changed, and a video camera having such a liquid-crystal monitor.

2. Description of the Related Art

In conventional video cameras, each having a liquid-crystal monitor, a fluorescent tube, serving as backlight, is provided behind the liquid-crystal monitor in order to improve visibility of the liquid-crystal monitor.

In addition, the luminance of the backlight is changed by changing current consumption of the backlight by controlling current flowing through the fluorescent tube, serving as the backlight, so that current consumption increases as the backlight is brighter, and decreases as the backlight is dimmer. That is, as for the current consumption of the main body of the video camera, current consumption increases as the backlight is brighter, and decreases as the backlight is dimmer.

It is also possible to variably set the luminance of the backlight by performing the above-described control according to an operation by the operator of the video camera, in order to make the backlight bright for the purpose of improving visibility in an environment having a large amount of external light, such as outdoors, and to make the backlight dim in an environment having a small amount of external light, such as indoors. The luminance of the backlight set by the above-described operation is stored according to an operation of turning on/off the power supply of the main body of the video camera, or used as a value peculiar to the video camera.

In the above-described conventional approach, however, it is necessary to change the luminance of the backlight by the operator of the video camera. As a result, when, for example, the operator has forgotten to change the luminance of the backlight in a state of setting the luminance to a large value, the power consumption of the main body of the video camera remains large.

SUMMARY OF THE INVENTION

It is an object of the present invention to reduce power consumption in a video camera without changing setting of the luminance of backlight by the operator.

According to one aspect, the present invention relates to a liquid-crystal display device including liquid-crystal display means, backlight means provided behind the liquid-crystal display means, means for turning on/off a power supply, and control means for reducing luminance of the backlight means when the power supply has been turned on.

According to another aspect, the present invention relates to a video camera including a liquid-crystal monitor for displaying an image picked up by the camera, backlight means provided behind the liquid-crystal monitor, means for turning on/off a power supply of the camera, and control means for reducing luminance of the backlight means when the power supply has been turned on.

According to still another aspect, the present invention relates to a video camera including a liquid-crystal monitor for displaying an image picked up by the camera, backlight means provided behind the liquid-crystal monitor, means for turning on/off a power supply of the camera, a standby switch for switching the video camera to a standby state, and control means for reducing luminance of the backlight means when the power supply has been turned on while the standby switch switches the video camera to the standby state.

According to yet another aspect, the present invention relates to a storage medium capable of being read by a computer, and storing a program. The program includes a control step of reducing luminance of backlight of a liquid-cyrstal monitor when a power supply has been turned on.

According to yet a further aspect, the present invention relates to a storage medium capable of being read by a computer, and storing a program. The program includes a measurement step of measuring a time period during which a power supply is in an off-state, and a control step of reducing luminance of a liquid-cyrstal monitor when the measured time period is less than a predetermined time period after the power supply has changed from the off-state to an on-state.

According to still another aspect, the present invention relates to a storage medium capable of being read by a computer, and storing a program. The program includes a detection step of detecting a voltage of a power supply, and a control step of reducing luminance of a liquid-cyrstal monitor in accordance with a result of the detection after the power supply has been turned on.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Figure 1:
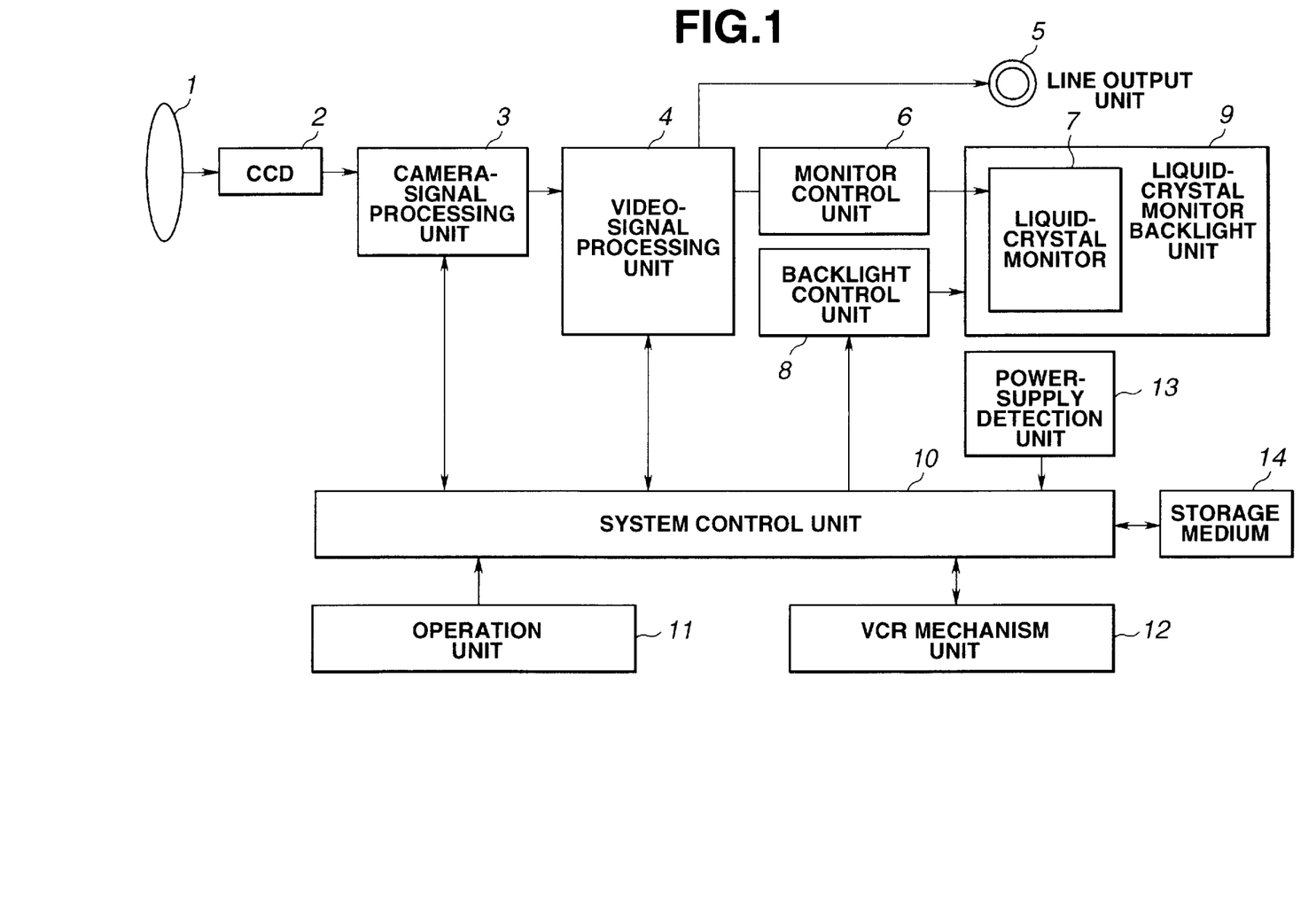
FIG. 1 is a block diagram illustrating the configuration of a video camera according to the present invention.

FIG. 1 is a block diagram illustrating the configuration of a video camera according to the present invention.

In FIG. 1, a lens 1 receives an image of an object. A CCD (charge-coupled device) 2 converts an input from the lens 1 into an image signal. A camera-signal processing unit 3 converts the image signal into a digital video signal by performing processing, such as AE or the like. A video-signal processing unit 4 records the video signal from the camera-signal processing unit 3 on a magnetic tape using a VCR (video cassette recorder) mechanism unit 12 having rotating heads, and reproduces the video signal from the magnetic tape and outputs the obtained signal to a line output unit 5 and a liquid-crystal monitor 7. The line output unit 5 performs line output of the signal from the video-signal processing unit 4. A monitor control unit 6 outputs the signal from the video-signal processing unit 4 to the liquid-crystal monitor 7.

The liquid-crystal monitor 7 displays the image signal from the monitor control unit 6. A backlight control unit 8 controls a backlight unit 9 of the liquid-crystal monitor 7. The backlight unit 9 of the liquid-crystal monitor 7 operates so that the liquid-crystal monitor 7 can be easily observed. A system control unit 10 includes a CPU (central processing unit) for controlling the entire camera. An operation unit 11 is operated by the operator of the video camera. The VCR mechanism unit 12 records/reproduces the image signal from the video-signal processing unit 4. A power-supply detection unit 13 detects whether or not the voltage of a battery (not shown), serving as the power supply for the main body of the video camera, is decreased.

A storage medium 14 stores programs for execution of respective operations shown in the flowcharts of FIGS. 2, 6 and 7 (to be described later) by the system control unit 10, and other data. The storage medium 14 is driven by a driving device (not shown). Since such a driving device is well known, further description thereof will be omitted. A semiconductor memory, an optical disk, a magnetooptical disk or a magnetic medium may be used as the storage medium, which may be configured in the form of a ROM (read-only memory), a RAM (random access memory), a memory card, a floppy disk, a magnetic card or the like.

Next, respective operations will be described.

Figure 2:
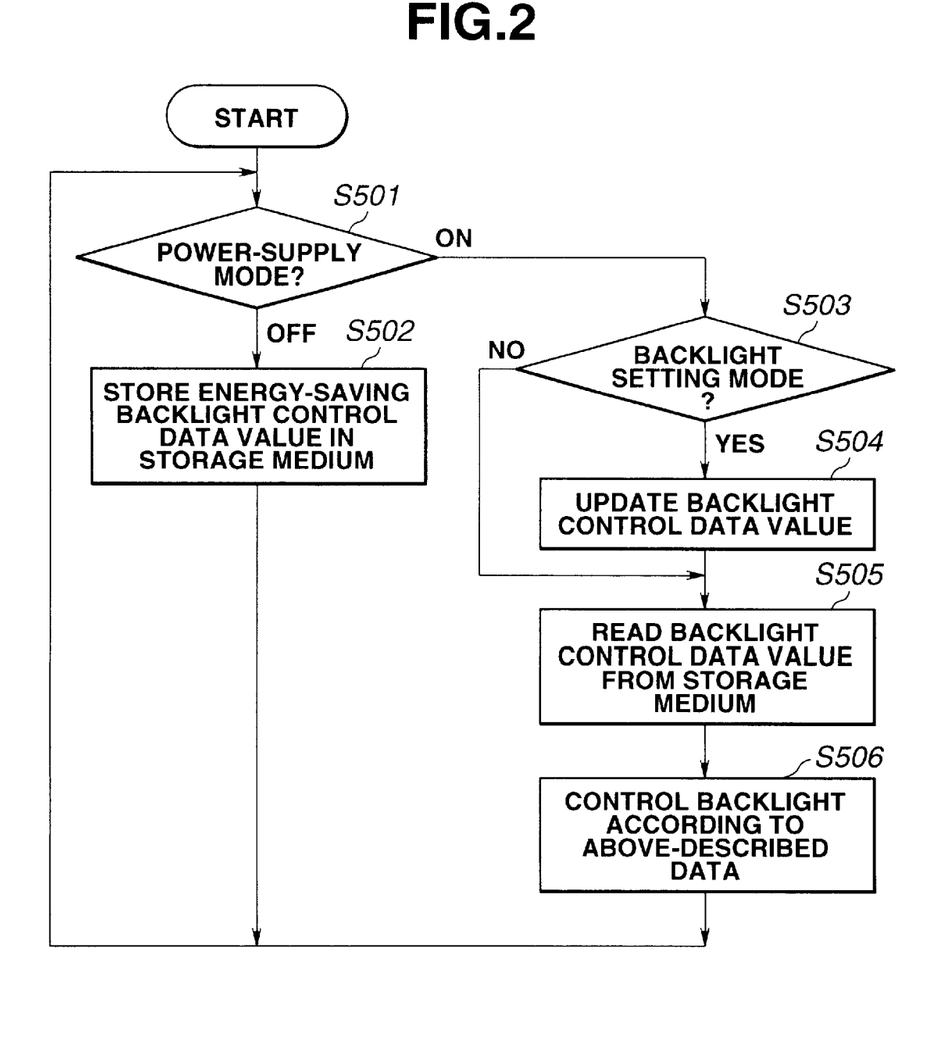
FIG. 2 is a flowchart illustrating the operation of a first embodiment of the present invention.

FIG. 2 is a flowchart illustrating the operation of a first embodiment of the present invention.

Figure 3:
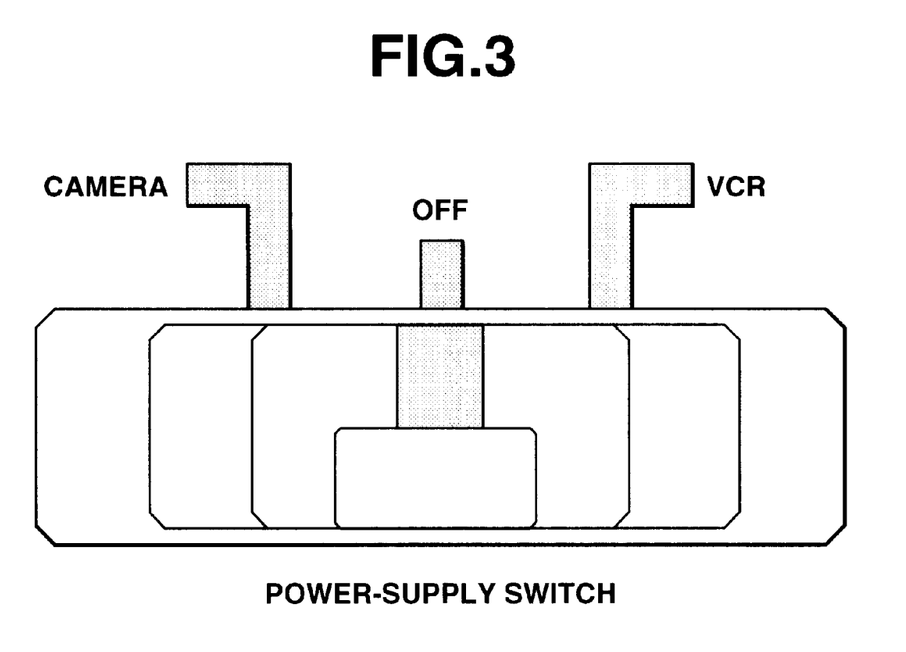
FIG. 3 is a diagram illustrating the configuration of a power-supply switch.

First, the system control unit 10 determines whether a power-supply mode of the main body of the video camera is in a on-state or in an off-state from the state of a power-supply switch as shown in FIG. 3 which is provided on the operation unit 11 (step S501). When the power-supply mode is in an off-state, energy-saving data providing small power consumption is used for a backlight control data value for the liquid-crystal monitor 7 stored in the storage medium 14, and that data is stored in the storage medium 14 (step S502).

Figure 4:
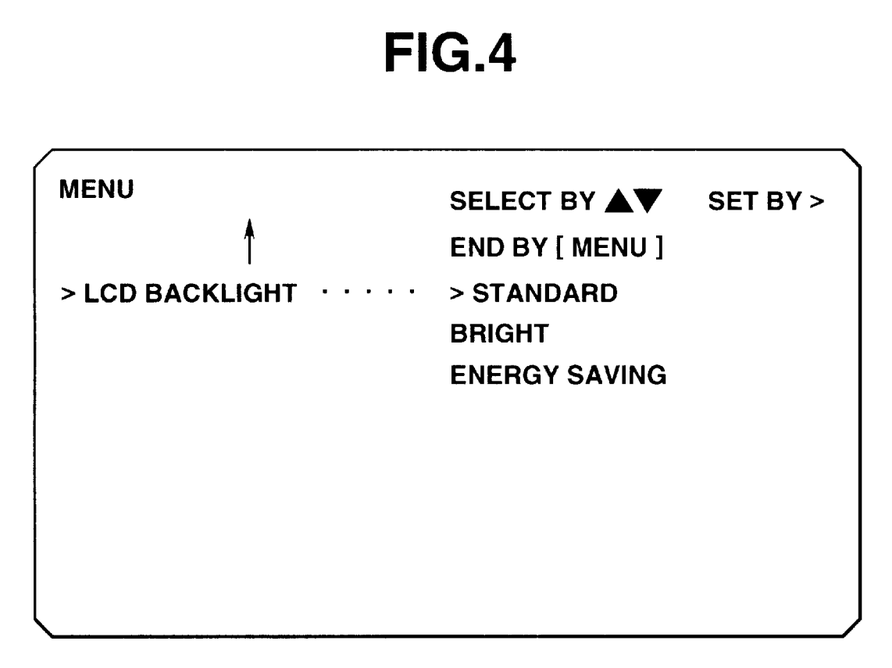
FIG. 4 is a diagram illustrating the configuration of a menu display.

When the power-supply mode is in an on-state, the process proceeds to step S503, where it is determined if a backlight setting mode according to a character display menu as shown in FIG. 4 is provided by an operation through the operation unit 11 by the operator. If the result of the determination in step S503 is affirmative, the process proceeds to step S504, where the backlight control data value for the liquid-crystal monitor 7 stored in the storage medium 14 is updated in order to provide setting by the menu shown in FIG. 4. Then, the updated backlight control data value stored in the storage medium 14 is read. If the result of the determination in step S503 is negative, the process proceeds to step S505, where the energy-saving data stored in step S502 is read.

Figure 5:
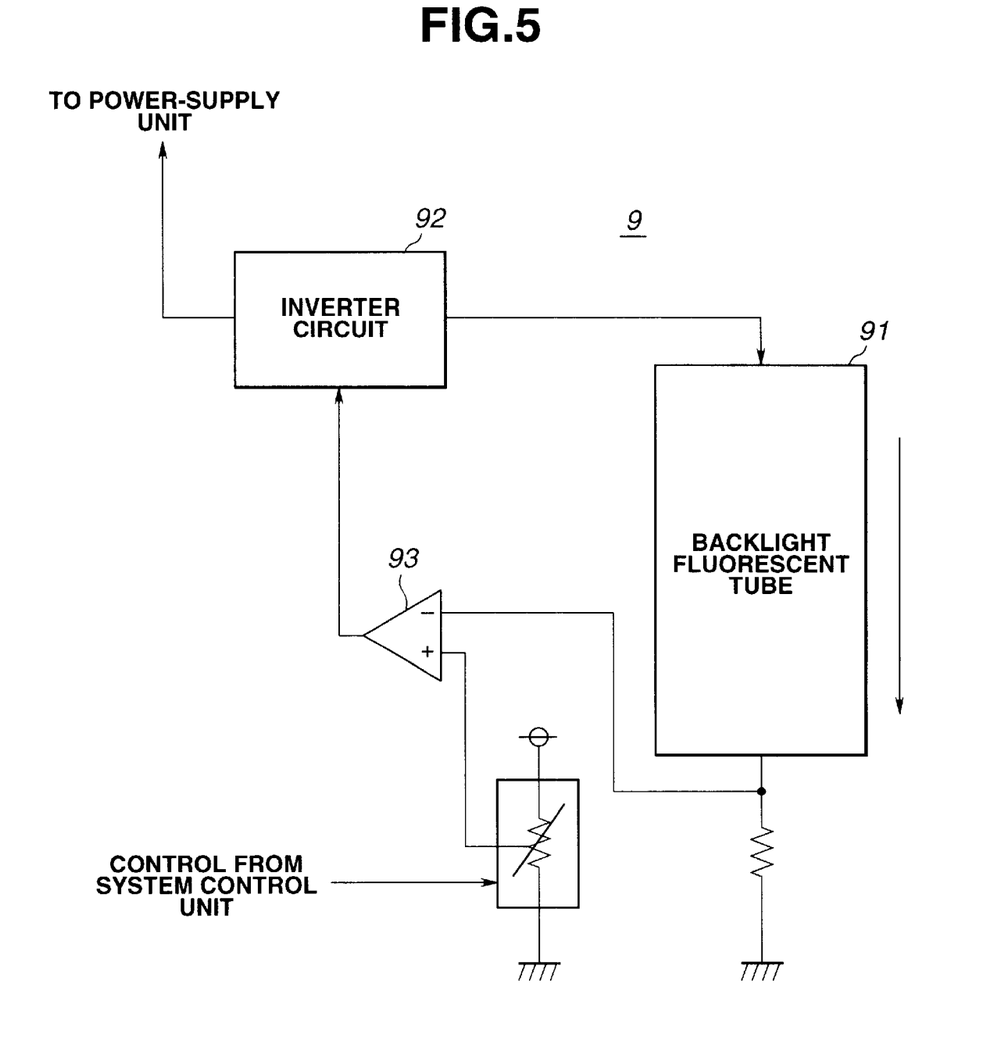
FIG. 5 is a diagram illustrating the configuration of a backlight control unit shown in FIG. 1.

Then, the system control unit 10 controls the luminance of the backlight unit 9 in the following manner. FIG. 5 is a block diagram illustrating the configuration of the backlight unit 9. The luminance of the backlight unit 9 is controlled by controlling current flowing through a backlight fluorescent tube 91.

First, electric power is supplied from the power supply of the main of the video camera to the backlight fluorescent tube 91 via an inverter circuit 92. In order to control current flowing through the backlight fluorescent tube 91, a feedback voltage from the backlight fluorescent tube 91 is compared by circuit 93 with a reference voltage variably set by the system control unit 10, and a comparison output is used as a feedback voltage for the inverter circuit 92. The system control unit 10 controls current flowing through the backlight fluorescent tube 91 by changing the output of the inverter circuit 92 by controlling the reference voltage. That is, when set data indicates "energy saving", current flowing through the back light fluorescent tube 91 is reduced, and when set data indicates "bright", current flowing through the backlight fluorescent tube 91 is increased (step S506).

According to the first embodiment, when the power supply of the main body of the video camera is changed from an off-state to an on-state by the operator, power consumption of the backlight of the liquid-crystal monitor 7 is always reduced. Hence, it is possible to solve the problem that the operator must change the setting, and to improve the operability of the video camera and realize low power consumption.

Next, a second embodiment of the present invention will be described. The second embodiment differs from the first embodiment in that, when the power-supply switch is on an off-state, the time period of the off-state is measured and subsequent processing is determined based on the measured value.

Figure 6:
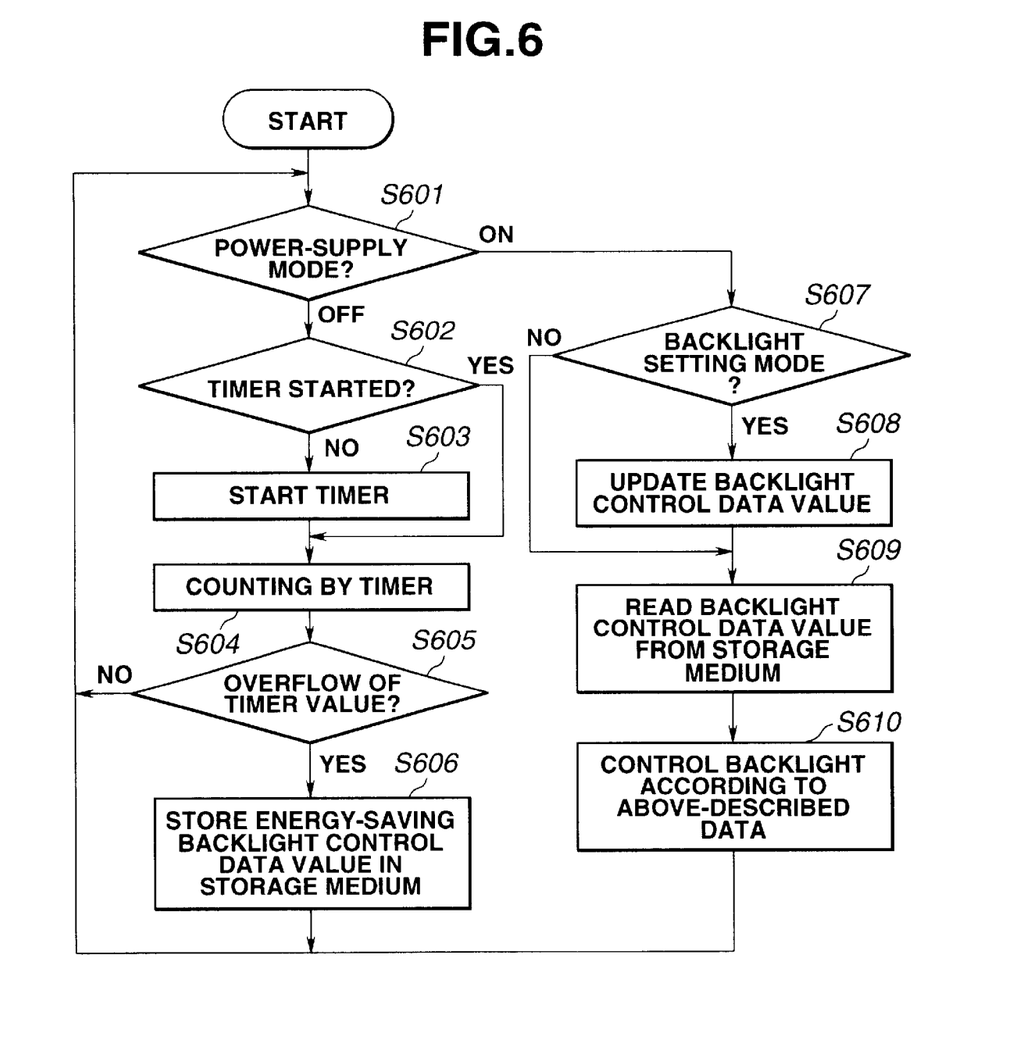
FIG. 6 is a flowchart illustrating the operation of a second embodiment of the present invention.

FIG. 6 is a flowchart illustrating the operation according to the second embodiment.

First, it is determined whether the power-supply switch shown in FIG. 3 is in an on-state or in an off-state (step S601). When the power supply mode is in an off-state, in order to measure if a predetermined time period has elapsed in the off-state, it is determined if a timer is started (step S602).

If the result of the determination in step S602 is negative, the process proceeds to step S603, where a value which will be overflowed at the predetermined time period is set in the timer, and the timer is started. In order to measure if the predetermined time period has elapsed in the off-state, counting by the timer is performed (step S604), and it is determined if overflow of the timer value has occurred (step S605).

When overflow due to the lapse of the predetermined time period has occurred, energy-saving data providing smaller power consumption is used for the backlight control data value for the liquid-crystal monitor 7 stored in the storage medium 14, and that data is stored in the storage medium 14.

When the power-supply mode is in an on-state, the process proceeds to step S607, where it is determined if the backlight setting mode according to the character display menu shown in FIG. 4 is provided by an operation through the operation unit 11 by the operator. If the result of the determination in step S607 is affirmative, the process proceeds to step S608, where the backlight control data value for the liquid-crystal monitor 7 stored in the storage medium 14 is updated in order to provide the setting shown in FIG. 4. Then, the updated backlight control data value stored in the storage medium 14 is read. If the result of the determination in step S607 is negative, the process proceeds to step S609, where the energy-saving data stored in step S606 is read. Then, the luminance of the liquid-crystal backlight unit 9 is controlled by the backlight control unit 9 shown in FIG. 5 in the same manner as in the first embodiment.

According to the second embodiment, the following effects are also provided in addition to the effects obtained in the first embodiment. That is, since a mode of reducing power consumption of the backlight of the liquid-crystal monitor 7 is provided only when the power supply of the main body of the video camera becomes in an on-state after a predetermined time period from an off-state provided by the operator, the luminance of the backlight set by the operator remains even if operations of switching between an on-state and an off-state within the predetermined time period are frequently performed, resulting in improvement in the operability of the apparatus. Furthermore, since the mode of reducing power consumption of the backlight of the liquid-crystal monitor 7 is provided only after the lapse of the predetermined time period, it is possible to solve the problem that the operator must change the setting, and to improve the operability of the video camera and realize low power consumption.

Next, a third embodiment of the present invention will be described. The third embodiment differs from the first embodiment in that the state of a battery is detected and subsequent processing is determined based on the result of the detection.

Figure 7:
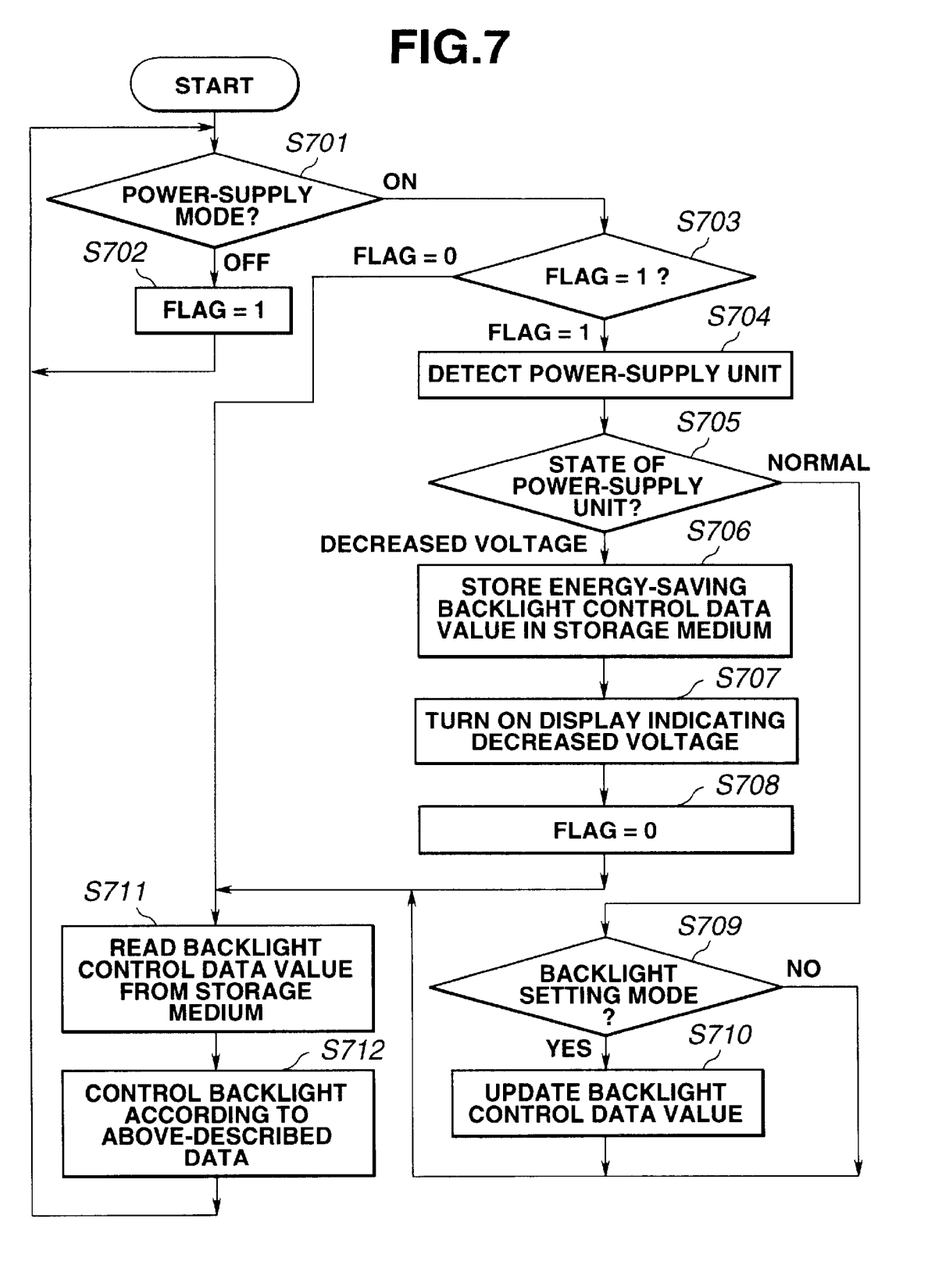
FIG. 7 is a flowchart illustrating the operation of a third embodiment of the present invention.

FIG. 7 is a flowchart illustrating the operation according to the third embodiment.

First, it is determined whether the power-supply switch shown in FIG. 3 is in an on-state or in an off-state (step S701). When the power supply mode is in an off-state, a FLAG indicating whether or not control of reducing power consumption of the backlight of the liquid-crystal monitor 7 due to a decrease in the voltage of the battery of the video camera is performed is initialized to "1" (step S702).

When the power supply mode is in an on-state, it is determined whether the FLAG assumes "1" or "0" due to a decrease in the voltage of the battery of the video camera (step S703). When the FLAG assumes "1", the power-supply detection unit 13 detects the state of the battery, serving as a power supply source (step S704). Then, it is determined if the voltage of the battery is decreased (step S705).

Figure 8:
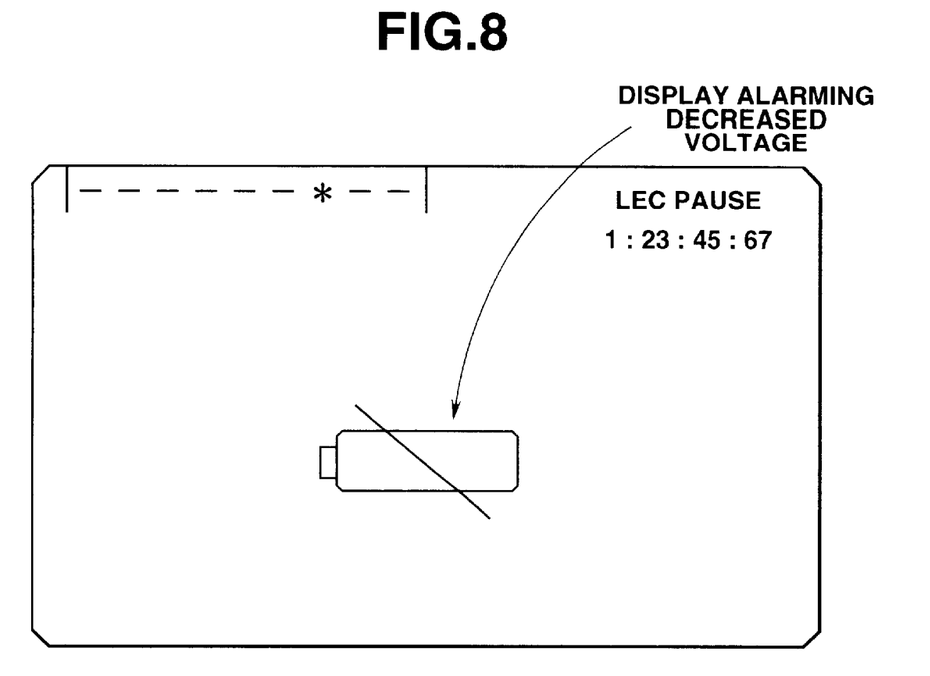
FIG. 8 is a diagram illustrating the configuration of a warning display.

When the voltage of the battery is decreased, data providing smaller power consumption is used for the backlight control data value for the liquid-crystal monitor 7 stored in the storage medium 14, and that data is stored in the storage medium 14 (step S706). Then, the system control unit 10 provides an alarm display indicating decreased voltage as shown in FIG. 8 using an output from the liquid-crystal monitor 7 or the line output unit 5 via the video-signal processing unit 4 (step S707).

Then, the FLAG indicating if control of reducing power consumption of the backlight of the liquid-crystal monitor 7 due to a decrease in the voltage of the battery of the video camera is performed is made "0", and this value is stored in the storage medium 14 (step S708). When the battery is in a normal state and control of reducing power consumption of the backlight due to a decrease in the voltage of the battery is not performed (FLAG=1), it is determined if the backlight setting mode according to the character display menu shown in FIG. 4 by an operation of the operator is provided (step S709).

If the result of the determination in step S709 is affirmative, the process proceeds to step S710, where the backlight control data value for the liquid-crystal monitor 7 stored in the storage medium 14 is updated in order to provide the setting shown in FIG. 4. Then, the updated backlight control data value stored in the storage medium 14 is read (step S711). If the result of the determination in step S709 is negative, the process proceeds to step S711, where the energy-saving data stored in step S706 is read (step S711). Then, the luminance of the backlight unit 9 shown in FIG. 5 is controlled in the above-described manner.

According to the third embodiment, the following effects are also provided in addition to the effects obtained in the first embodiment. That is, since a mode of reducing power consumption of the backlight of the liquid-crystal monitor 7 is provided only when the power supply of the main body of the video camera changes from an off-state to an on-state by the video camera operator and the voltage of the battery is in a decreased state as a result of detection, and the luminance of the backlight set by the operator remains when the power supply is in a normal state, the operability of the apparatus is improved. Furthermore, since the mode of reducing power consumption of the backlight of the liquid-crystal monitor 7 is provided only after the lapse of the predetermined time period, it is possible to solve the problem that the operator must change the setting, and to improve the operability of the video camera and realize low power consumption.

The following fourth, fifth and sixth embodiments of the present invention differ from the above-described first, second and third embodiments in that processing of determining on/off of a standby mode before determining on/off of the power-supply mode is added.

Figure 9:
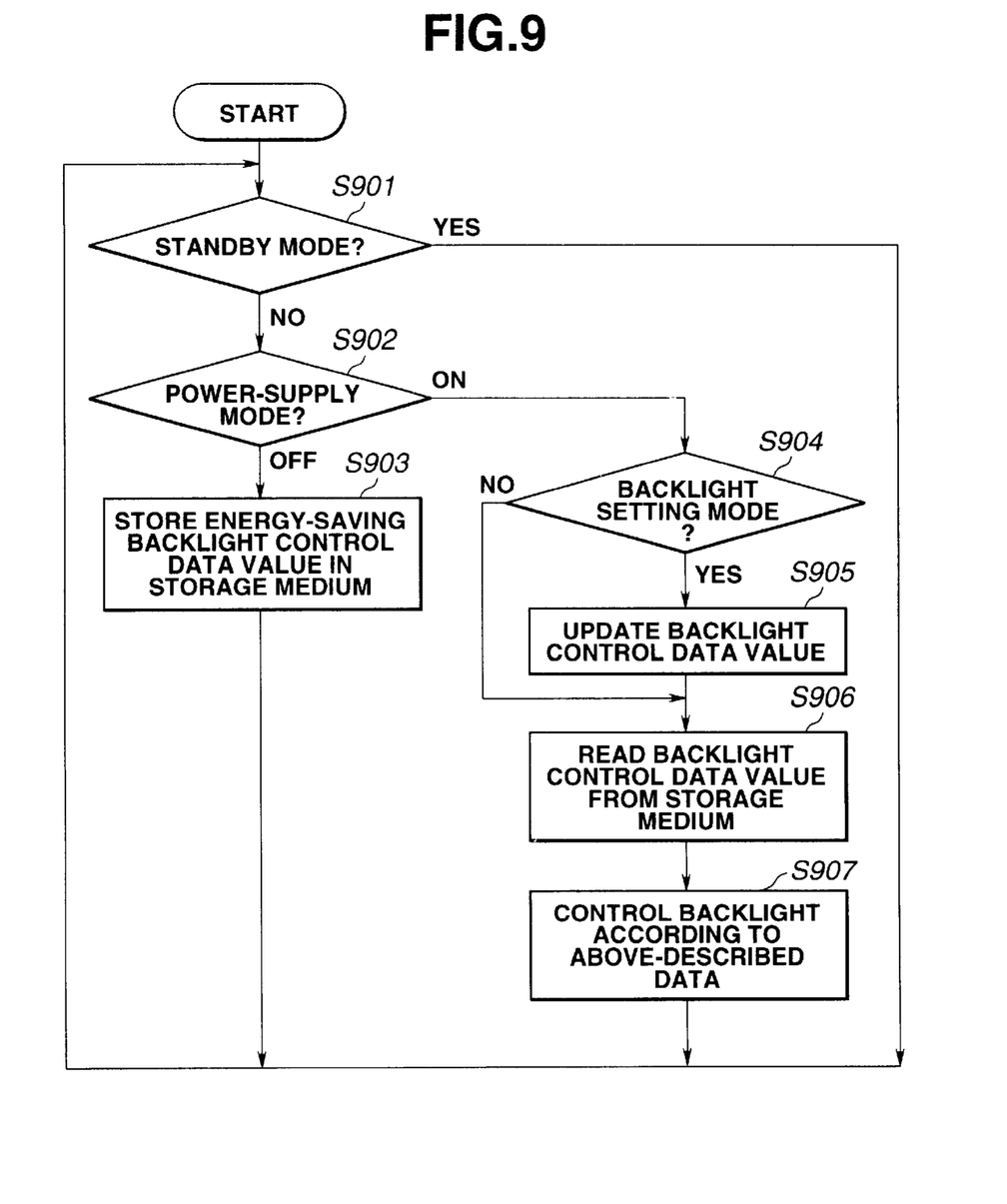
FIG. 9 is a flowchart illustrating the operation of a fourth embodiment of the present invention.
Figure 10:
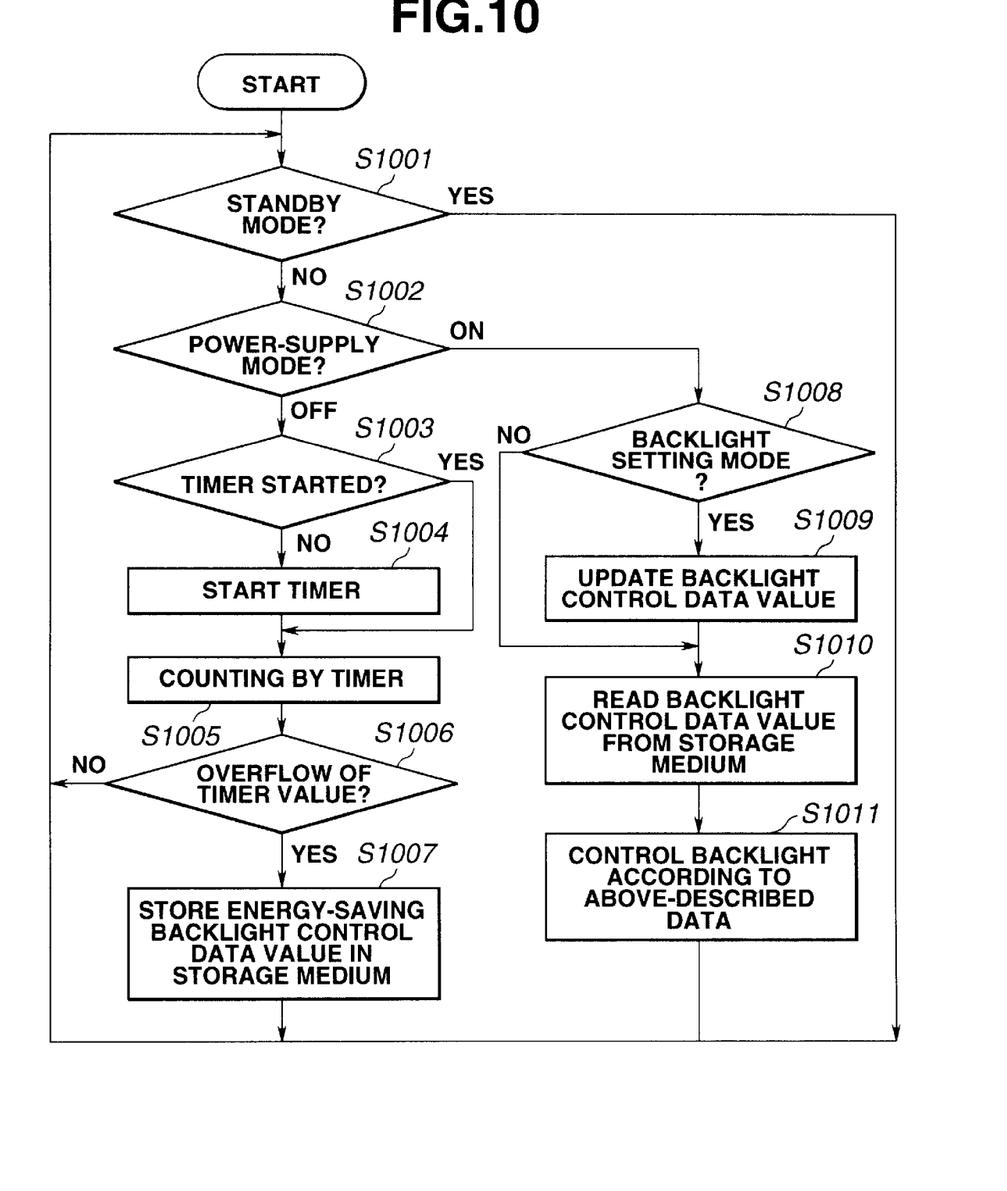
FIG. 10 is a flowchart illustrating the operation of a fifth embodiment of the present invention.
Figure 11:
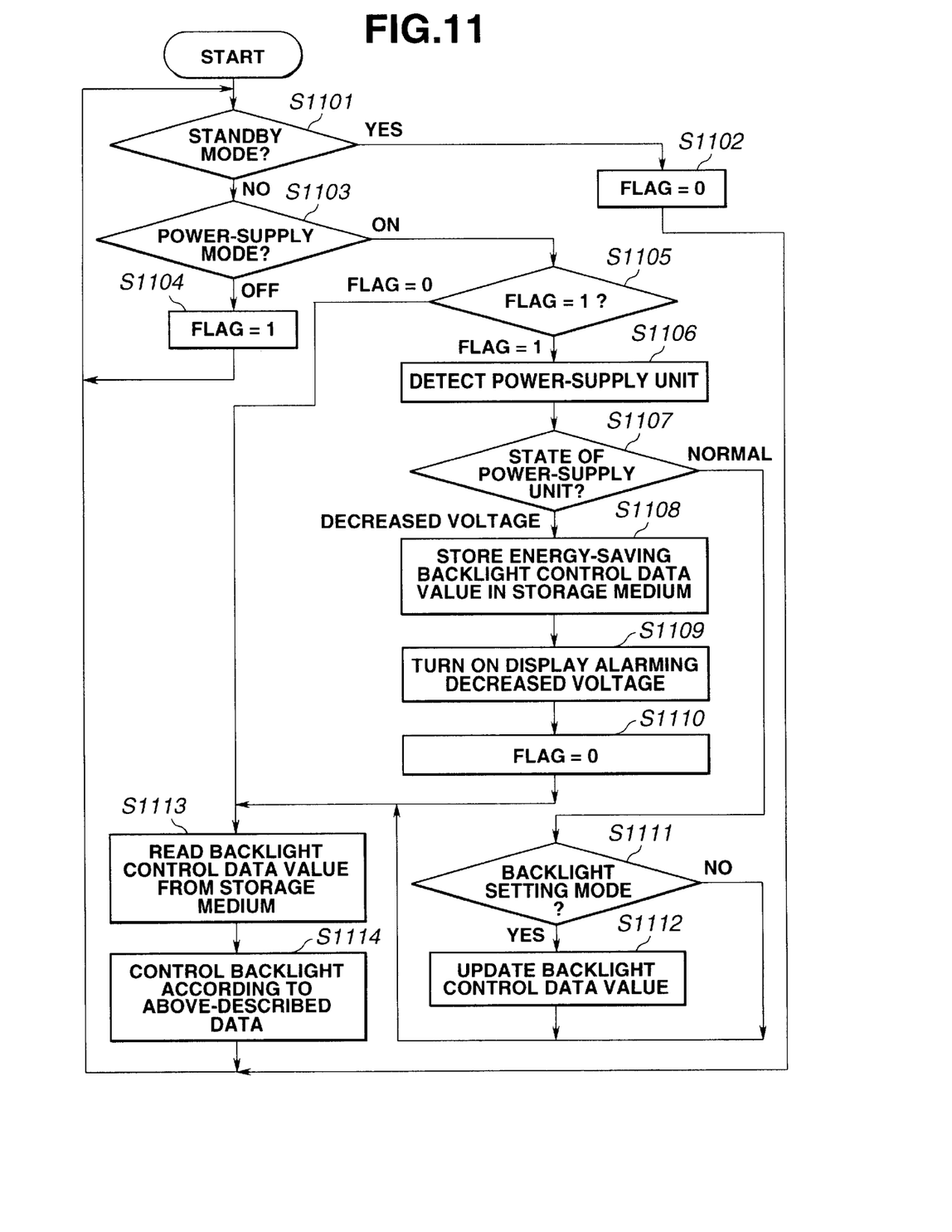
FIG. 11 is a flowchart illustrating the operation of a sixth embodiment of the present invention.

FIGS. 9, 10 and 11 are flowcharts illustrating the operations according to the fourth, fifth and sixth embodiments, respectively.

Figure 12:
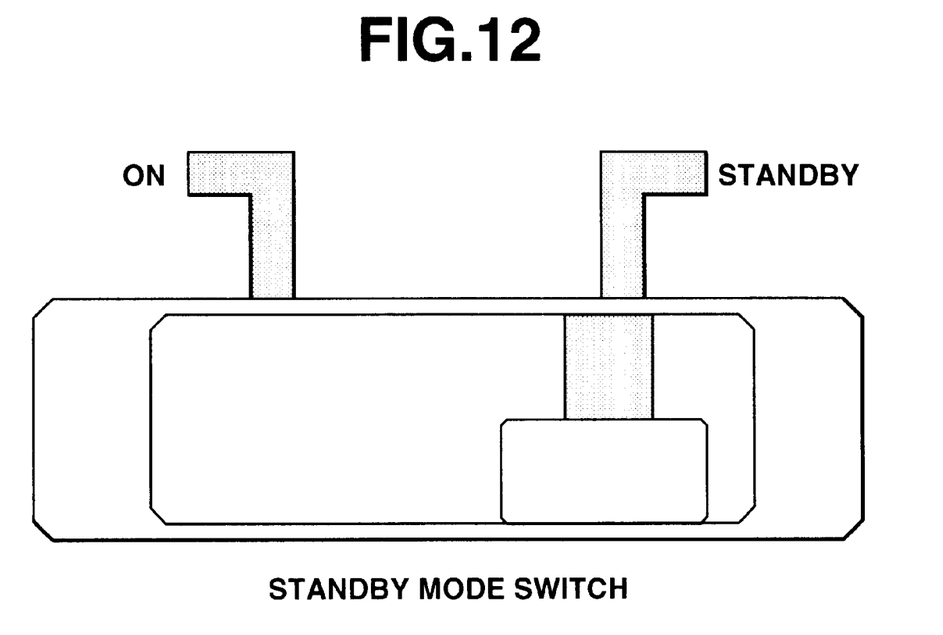
FIG. 12 is a diagram illustrating the configuration of a standby switch for setting a standby mode in the video camera.

In the fourth, fifth and sixth embodiments, first, the system control unit 10 determines if a standby switch (see FIG. 12) provided on the operation unit 11 is in a standby mode (steps S901, S1001 and S1101, respectively). When the standby switch is in the standby mode, subsequent processing is not performed and the process returns to the start in the fourth and fifth embodiments. In the sixth embodiment, the system control unit 10 initializes a FLAG indicating if control of reducing power consumption of the backlight of the liquid-crystal monitor 7 due to a decrease in the voltage of the battery of the video camera is performed to "0" (step S1102), and the process then returns to the start without performing subsequent processing.

When the standby switch is not in the standby mode, the same operations as in the first, second and third embodiments are performed in the fourth, fifth and sixth embodiments, respectively. That is, the processing of steps S902–S907 shown in FIG. 9 corresponds to the processing of steps S501–S506 shown in FIG. 2, the processing of steps S1002–S1011 shown in FIG. 10 corresponds to the processing of steps S601–S610 shown in FIG. 6, and the processing of steps S1103–S1114 shown in FIG. 11 corresponds to the processing of steps S701–S712 shown in FIG. 7, respectively.

According to the above-described fourth and fifth embodiments, since the setting of the backlight is not changed when the video camera is in the standby mode, the operability of the apparatus is improved, and power consumption in the video camera is reduced. When the video camera is not in the standby mode, the same effects as in the first and second embodiments are obtained.

According to the sixth embodiment, when the video camera is in the standby mode, the same effects as in the standby mode in the fourth and fifth embodiments are obtained. Since the setting of the luminance remains when the power supply is turned on from the standby mode by releasing the standby mode, switching of the setting by the operator is unnecessary, resulting in improvement in the operability of the apparatus, and reduction in power consumption in the video camera. When the video camera is not in the standby mode, the same effect as in the third embodiment is obtained.

The individual components designated by blocks in the drawings are all well known in the video camera arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A device comprising:
   liquid-crystal display means;
   backlight means provided behind said liquid-crystal display means;
   means for turning on/off a power supply;
   measurement means for measuring a time period during which the power supply is turned off; and
   control means for reducing luminance of said backlight means when the power supply has been turned on, wherein said control means reduces the luminance of said backlight means when the measured time period exceeds a predetermined time period when the power supply changes from an off-state to an on-state.

2. A device according to claim 1, further comprising detection means for detecting a voltage of the power supply, and wherein said control means reduces the luminance of said backlight means in accordance with the detection when the power supply has been turned on.

3. A device according to claim 1, further comprising setting means for setting the luminance of said backlight means, wherein said control means reduces the luminance irrespective of the setting.

4. A video camera comprising:
   a liquid-crystal monitor for displaying an image picked up by said camera;
   backlight means provided behind said liquid-crystal monitor;
   means for turning on/off a power supply of said camera;
   measurement means for measuring a time period during which the power supply is turned off: and
   control means for reducing luminance of said backlight means when the power supply has been turned on, wherein said control means reduces the luminance of said backlight means when the measured time period exceeds a predetermined time period when the power supply changes from an off-state to an on-state.

5. A video camera according to claim 4, further comprising detection means for detecting a voltage of the power supply, and wherein said control means reduces the luminance of said backlight means in accordance with the detection when the power supply has been turned on.

6. A video camera according to claim 4, further comprising setting means for setting the luminance of said backlight means, and wherein said control means reduces the luminance irrespective of the setting.

7. A video camera comprising:
   a liquid-crystal monitor for displaying an image picked up by said camera;
   backlight means provided behind said liquid-crystal monitor;
   means for turning on/off a power supply of said camera;
   a standby switch for switching said video camera to a standby state; and
   control means for reducing luminance of said backlight means when the power supply has been turned on while said standby switch switches said video camera to the standby state.

8. A storage medium capable of being read by a computer, and storing a program, said program causing the computer to perform:
   a measurement step of measuring a time period during which a power supply is in an off-state; and
   a control step of reducing luminance of a liquid-crystal monitor when the measured time period is more than a predetermined time period after the power supply has changed from the off-state to an on-state.

* * * * *

UNITED STATES PATENT AND TRADEMARK OFFICE
CERTIFICATE OF CORRECTION

PATENT NO. : 6,714,245 B1
DATED : March 30, 2004
INVENTOR(S) : Yazumasa Ono

It is certified that error appears in the above-identified patent and that said Letters Patent is hereby corrected as shown below:

Title page,
Item [56], References Cited, FOREIGN PATENT DOCUMENTS, "06315127" should read -- 06-315127 --.

Column 4,
Line 6, "the main of" should read -- the main part of --.

Column 8,
Line 9, "off:" should read -- off; --.

Signed and Sealed this

Twentieth Day of July, 2004

JON W. DUDAS
*Acting Director of the United States Patent and Trademark Office*